(No Model.)
H. C. STRONG.
Plow Truck.
No. 234,087. Patented Nov. 2, 1880.
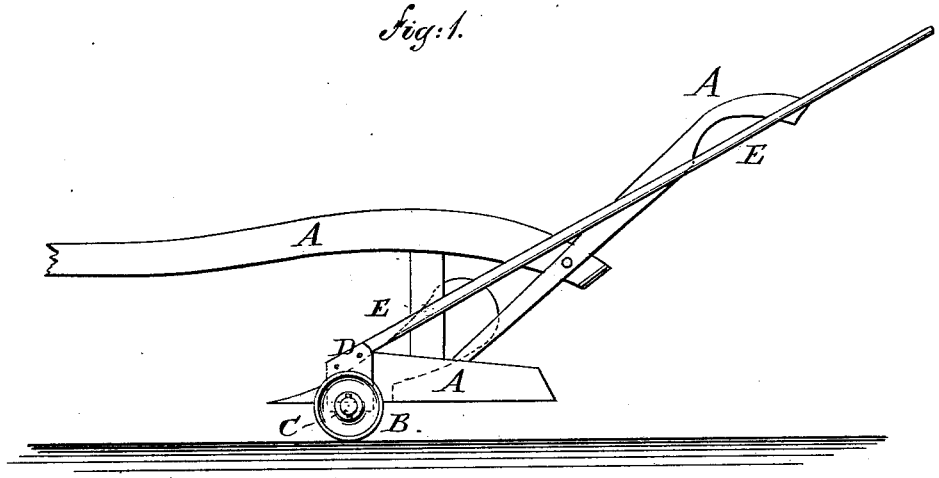
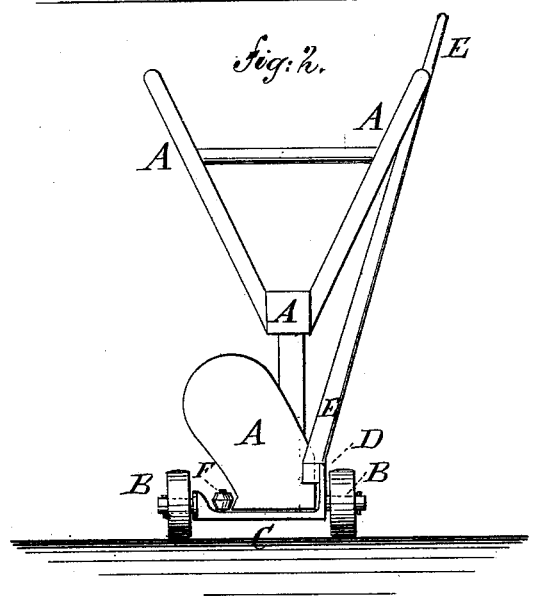
WITNESSES:
Chas. Nida.
C. Sedgwick
INVENTOR:
H. C. Strong
BY Munn & Co
ATTORNEYS.

UNITED STATES PATENT OFFICE.

HENRY C. STRONG, OF MAUSTON, WISCONSIN.

PLOW-TRUCK.

SPECIFICATION forming part of Letters Patent No. 234,087, dated November 2, 1880.

Application filed June 3, 1880. (No model.)

*To all whom it may concern:*

Be it known that I, HENRY CLAY STRONG, of Mauston, in the county of Juneau and State of Wisconsin, have invented a new and useful Improvement in Plow-Trucks, of which the following is a specification.

Figure 1 is a side elevation of the improvement, illustrating its use. Fig. 2 is a front elevation.

The object of this invention is to furnish trucks for moving plows from place to place in manufactories, warehouses, sales-rooms, and upon farms, which shall be so constructed that the plows can be easily moved without any danger of breaking, marring, or wearing the said plows.

The invention consists in constructing a plow-truck of a pair of wheels, an axle having a flange near one end, a handle, and a button, whereby a plow may be readily placed upon the truck and securely held while being drawn from place to place, as will be hereinafter fully described.

Similar letters of reference indicate corresponding parts.

A represents an ordinary plow. B are two small wheels, placed upon journals at the ends of a bar or axle, C. The axle C is made flat upon the upper side, and upon it, near one of the wheels B, is formed, or to it is attached, a flange, D, to the inner side of which is bolted the forward end of the handle E. To the upper side of the axle C, near the other wheel B, is attached a button or knob, F.

In using the truck, the point of the plow A is raised by bearing down upon the share-side plow-handle, and the truck is drawn beneath the said point, so that the forward part of the landside of the plow may rest against the flange D, the shin or colter of the plow against the forward end of the handle E, and the edge of the share against the button F, the handle E projecting along the side of the landside-handle of the plow. With this arrangement the plow can be readily moved from place to place, or can be drawn from the barn to any desired part of the farm, and from the field back to the barn, without any danger of marring any part of the plow. With this arrangement also the plow can be tilted to either side and run upon one wheel in turning and showing it without getting it out of place upon the truck.

I am aware that trucks with one or two wheels for carrying plows or harrows have been heretofore used; but

What I claim as new and of my invention is—

In a truck for carrying plows, the handle E and the knob F, combined with the axle C, made flat on the upper side and provided with the flange D, as shown and described.

HENRY CLAY STRONG.

Witnesses:
 FRED. S. VEEDER,
 J. W. RUSSELL.